(12) United States Patent
Lai et al.

(10) Patent No.: US 7,765,490 B2
(45) Date of Patent: Jul. 27, 2010

(54) METHOD AND SYSTEM FOR SOFTWARE APPLICATIONS USING A TILED USER INTERFACE

(75) Inventors: Jennifer C. Lai, Garrison, NY (US); Anthony Levas, Yorktown Heights, NY (US); Mark E. Podlaseck, New Preston, CT (US); Sachiko Yoshihama, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 2333 days.

(21) Appl. No.: 09/906,829

(22) Filed: Jul. 18, 2001

(65) Prior Publication Data

US 2003/0016247 A1 Jan. 23, 2003

(51) Int. Cl.
*G06F 3/00* (2006.01)

(52) U.S. Cl. .................... 715/810; 715/788; 715/828

(58) Field of Classification Search ............... 715/764, 715/767, 771, 788, 792, 802, 810, 811, 800, 715/835, 837, 965, 503, 828
See application file for complete search history.

(56) References Cited

U.S. PATENT DOCUMENTS

| | | | | | |
|---|---|---|---|---|---|
| 5,544,354 | A | * | 8/1996 | May et al. ..................... 707/4 |
| 5,588,107 | A | * | 12/1996 | Bowden et al. ............. 715/828 |
| 5,644,737 | A | * | 7/1997 | Tuniman et al. ............ 715/810 |
| 5,712,995 | A | * | 1/1998 | Cohn ........................ 715/792 |
| 5,856,826 | A | * | 1/1999 | Craycroft .................... 715/788 |
| 5,984,502 | A | * | 11/1999 | Calder ......................... 700/83 |
| 5,986,657 | A | | 11/1999 | Berteig et al. ............... 345/792 |
| 6,182,094 | B1 | * | 1/2001 | Humpleman et al. ........ 715/234 |
| 6,686,938 | B1 | * | 2/2004 | Jobs et al. ................... 715/835 |

* cited by examiner

*Primary Examiner*—Kieu Vu
*Assistant Examiner*—Michael Roswell
(74) *Attorney, Agent, or Firm*—McGinn IP Law Group, PLLC

(57) ABSTRACT

A method and structure for a tiled interface system provides a Tiled User Interface (TUI) in which a tile manager manages at least one tile cluster on a display device and translates an input event into a tile cluster event and at least one tile cluster controlled by the tile manager to be displayed on the display device. Each tile cluster includes at least one tile, each tile cluster corresponds to one or more predefined functions for a specific application, each tile cluster provides a complete interaction of all the predefined functions for the specific application respectively corresponding to that tile cluster, and each tile cluster can be presented in its entirety on a single frame of the display device using at most one input event.

37 Claims, 12 Drawing Sheets

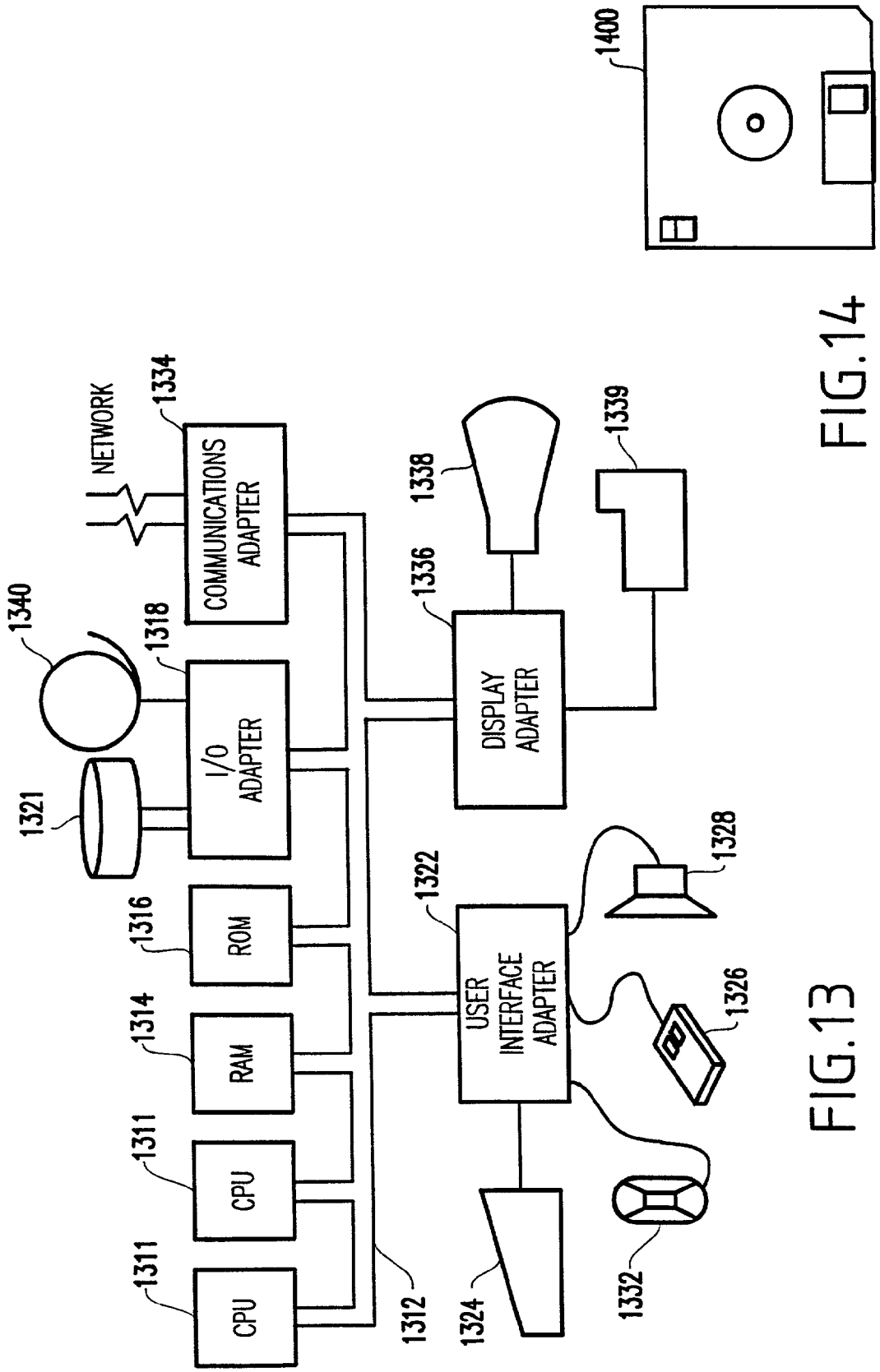

METHOD AND SYSTEM FOR SOFTWARE APPLICATIONS USING A TILED USER INTERFACE

BACKGROUND OF THE INVENTION

1. Field of the Invention

The present invention generally relates to a computer interface providing at-a-glance display of information and/or control. Specifically, inter-linkable tiles provide a single-screen overview display/control panel. A typical Tile User Interface (TUI) implementation involves a centralized theme, such as an office environment, in which it is desirable to get an overview of multiple applications involving a number of relevant controls and displays of information. From the overview display, the user can select a tile to expand a selected application into additional inter-related tiles that can be designed to display all of any remaining functions of the selected application. The invention, thereby, provides not only an at-a-glance overview screen but also provides the capability of accessing all functions for any application with no more than one user input event. Additionally, a user has the flexibility to intermix applications and add hierarchy features to customize a TUI.

2. Description of the Related Art

Computer users today often work on many applications at once on a single computer screen. This results in constantly navigating (opening, closing, and minimizing) many "windows" to access frequently-used information. Such navigating results in considerable wasted time and effort and can result in important information being missed or overlooked because a particular application window was not open at a critical time.

For example, viewing entries on a calendar, to-do list, the status of buddies, current temperature, current time, etc., usually requires many clicks through different applications that have interfaces designed in different ways. Information is not viewable at a glance and is not easily navigated with just a few clicks.

SUMMARY OF THE INVENTION

In view of the foregoing and other problems of the conventional methods and systems, the present invention provides a simple Tiled User Interface (TUI) design paradigm permitting aggregation of frequently-used information to provide information-at-a-glance for that information. The invention also provides very easy access and control of frequently-utilized tasks. A user can easily add new applications to an existing TUI, can intermix applications, and can add recursiveness to create levels of hierarchy to a TUI, thereby creating a personalized, customized TUI.

As an example of frequently-utilized tasks, an office worker might want to view or change parameters such as lighting or temperature of the immediate environment or communicate with one or more office mates. The central theme here is the office worker's immediate environment. There are a number of applications such as on/off status of various lights, status/control of air conditioning (both cooling and heating) parameters, and current status of office mates that combine to make up this central theme. According to the present invention, this central theme can be developed into a TUI. The TUI can be implemented on a secondary (ie. non-primary) display such as an office worker's computer used as a workstation, or it can be implemented on a primary display dedicated to the sole purpose of the TUI. If the TUI is implemented on a dedicated device, then this device could then be referred to as an "office appliance".

The solution offered by the invention provides a new user interface paradigm that enables easy personalization of included tasks and feedback, information-at-a-glance, and one-touch interaction. The invention is not confined to the office environment discussed below but can be used in many other platforms or settings, such as kiosks and other types of appliances.

The problem addressed by the present invention is the representation and easy access to information. The gridded tiles of the present invention provide a novel framework for representing and adjusting state. The grid exploits the inter-related tile format common in comic books that represent cause-and-effect, history, alternative choices, as well as linear and non-linear chunks of information. The benefit of such a representation is that the user can intuitively understand this new tiled-display paradigm since it is based on an approach so simplistic that even children can easily relate to it.

The prototype of this invention was implemented on top of a browser since some aspects of the invention suggest a network interface. The invention can also be implemented without using a browser. Web browsers today are no longer simply tools for browsing documents, but rather infrastructure to build web-based applications on top of various Internet technologies. DHTML (Dynamic HTML) is one of these technologies with which one can build a dynamic web application using Script and Style Sheet. However, because of the nature of the scripting language, it is usually a painful job to write a set of complicated DHTML applications that interact each other. It is also difficult to write script code as reusable basic components.

The invention provides a solution to this problem by providing a tiled framework on top of web browser technologies. Here, a tiled framework is a logical set of graphical representations through which users interact with the application logic. The term 'application' in the following discussion will typically not mean an application program to be invoked by an operating system but, rather, refers to a specific task or function that is the object of an interface with a user. An application in this sense, for example, might be the display and control of lights in the immediate environment. A second application might be the display and control of temperature.

However, an "application" could also be a broader concept and does not necessarily relate to a single feature such as temperature or lighting. A designer or user can potentially intermix various seemingly unrelated features. For example, a user might choose to have an application displaying both temperature and lighting information/controls as a single application rather than two separate applications.

An "application" could also incorporate the aspect of hierarchy and recursiveness. Selecting a tile causes a next level of tiles to appear. So, for example, that same user might consider that it makes sense to add a hierarchy of tiles, applications, and functions, so that the highest level presents tiles for temperature and lighting. Selecting a tile causes, for example, the temperature tile or tiles to expand into a display mode, and selecting one of these display-mode tiles causes another expansion for control functions.

It is, therefore, an object of the present invention to provide a structure and method for a system to support touch-based interactive applications with rich content. Key advantages of the invention are that it supports and simplifies the development of a large class of applications and that it has simple system requirements so that it can be implemented within a browser.

To achieve the above objects and goals, according to a first aspect of the invention, disclosed herein is a method and structure for a tiled interface system including a tile manager to manage at least one tile cluster on a display device and to translate any of an input event into a tile cluster event and at least one tile cluster controlled by the tile manager to be displayed on the display device, wherein each tile cluster contains at least one tile, wherein each tile cluster corresponds to one or more predefined functions for a specific application, wherein each tile cluster provides a complete interaction of all the predefined functions for the specific application respectively corresponding to that tile cluster, and wherein each tile cluster can be presented in its entirety on a single frame of the display device using at most one input event.

According to a second aspect of the present invention, disclosed herein is a method of interfacing a user with at least one application, the application composed of at least one function, including, for each application, generating a corresponding tile cluster for a display device, where the corresponding tile cluster includes at least one tile, each tile containing a graphic information related to the corresponding application, wherein the corresponding tile cluster embeds all of the function for the corresponding application, providing an interface allowing the user to provide input events by selecting one of the tiles, and translating any of the user tile selections into a tile cluster event, wherein each tile cluster can be entirely displayed on the display device using no more than one tile cluster event.

According to a third aspect of the present invention, disclosed herein is a method of using a display device to interface a user with at least one application, where the application includes at least one function, including dividing a display of the display device into tile units, for each application, developing a corresponding tile cluster containing at least one tile unit, where the tile cluster contains graphic representations of all the function of the corresponding application, providing an input entry for the user based on a capability for the user to select one of the tile units of the display, and translating any of the user input entries into a tile cluster event, wherein, for all applications, the corresponding tile cluster is displayed in its entirety using no more than one tile cluster event.

According to a third aspect of the present invention, disclosed herein is an apparatus for a tiled interface system, including a display unit, at least one user input device, and a device executing instructions for the tiled interface system described above.

According to a fourth aspect of the present invention, disclosed herein is a computer executing a set of instructions for the tiled interface system described above.

According to a fifth aspect of the present invention, disclosed herein is a storage medium tangibly containing a set of computer executable instructions for a tiled interface system described above.

With the unique and unobvious aspects of the present invention, a user not only has the advantage of an at-a-glance overview screen but also can access all functions for any application with no more than one click.

BRIEF DESCRIPTION OF THE DRAWINGS

The foregoing and other objects, aspects and advantages will be better understood from the following detailed description of a preferred embodiment of the invention with reference to the drawings, in which:

FIG. 13 illustrates an exemplary hardware/information handling system 1300 for incorporating the present invention therein; and FIG. 14 illustrates a signal bearing medium 1400 (e.g., storage medium) for storing steps of a program of a method according to the present invention.

DETAILED DESCRIPTION OF A PREFERRED EMBODIMENT OF THE INVENTION

Figure 1:
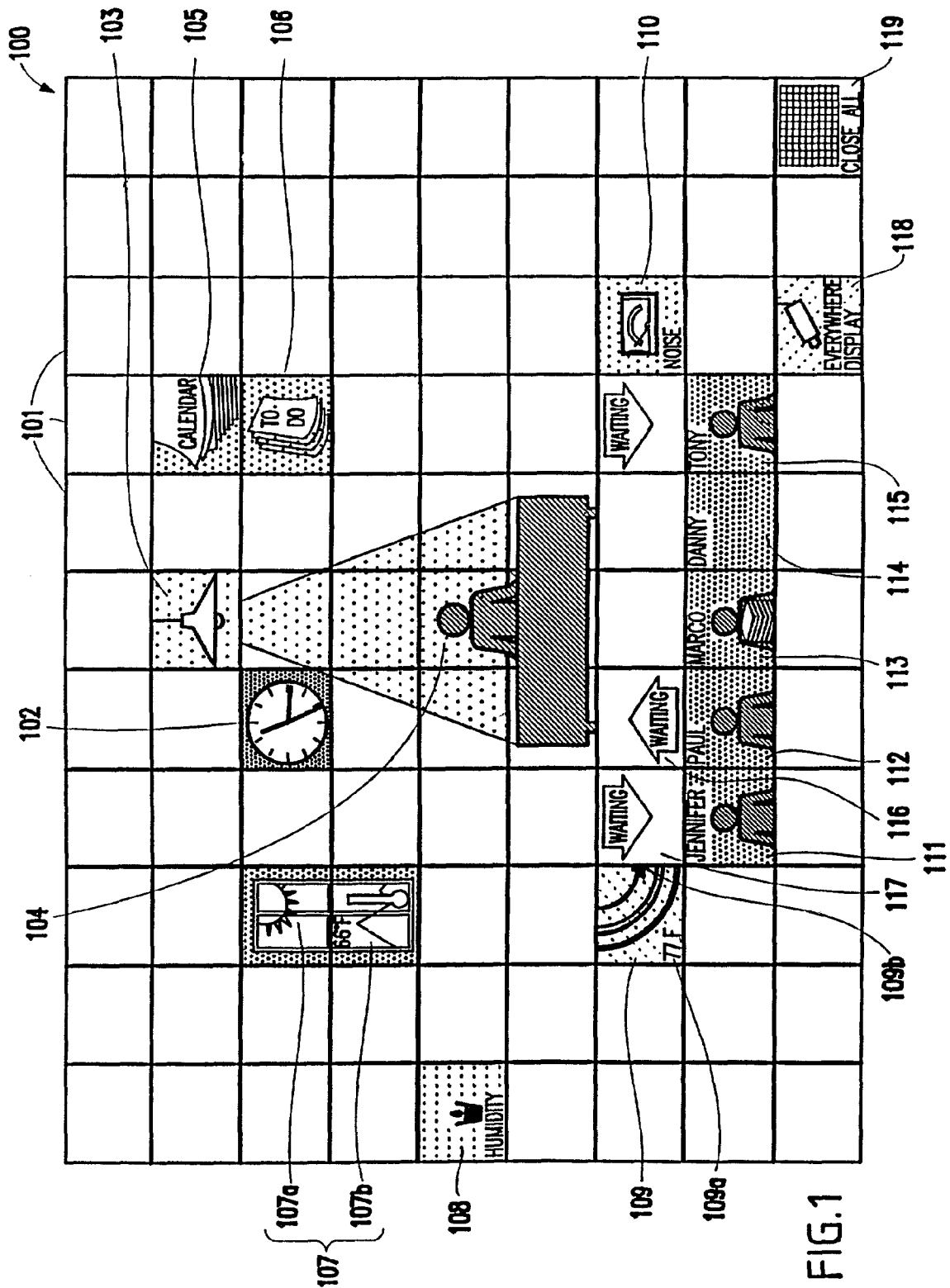
FIG. 1 illustrates an exemplary TUI of an office worker's environment with all tile clusters closed.

Referring now to the drawings, and more particularly to FIG. 1, a key aspect of the invention is that a Tiled User Interface (TUI) 100 includes a matrix of one or more tiles (101, 102, 103, etc.) presented on a display device such as a monitor or projector. These tiles, presented as visually distinct predefined shapes, are used as the only means of input and output of this TUI (e.g., preferably as the only input/output mechanism). The user input is exercised by selecting ("touching") a tile, using any one of several known possible methods such as finger/touchscreen, finger/keyboard, mouse/display, trackpoint/finger, or trackball/finger. The invention is not limited to these specific input methods but includes other more unusual user inputs such as laser pointer/projected image, voice/display, gaze detector/display, or any other computer user input method, since it is not important how the user input arrives into the tile interface system.

The tiles of a TUI typically would reveal their intended function to the TUI user by their visual representation, which would incorporate a meaningful text, drawn image, picture, or other iconic type representation. A "tile cluster" is a group of tiles inter-related by reason of performing a common preprogrammed application or function. A tile cluster might be expandable/collapsible as described below or it could be fully visible at all times as a simple inter-related grouping of tiles. A tile cluster could even be a single tile. A tile cluster can also be developed as part of a hierarchy of tile clusters, so that selection of a tile in one level causes an expansion to display a lower level tile cluster.

Figure 2:
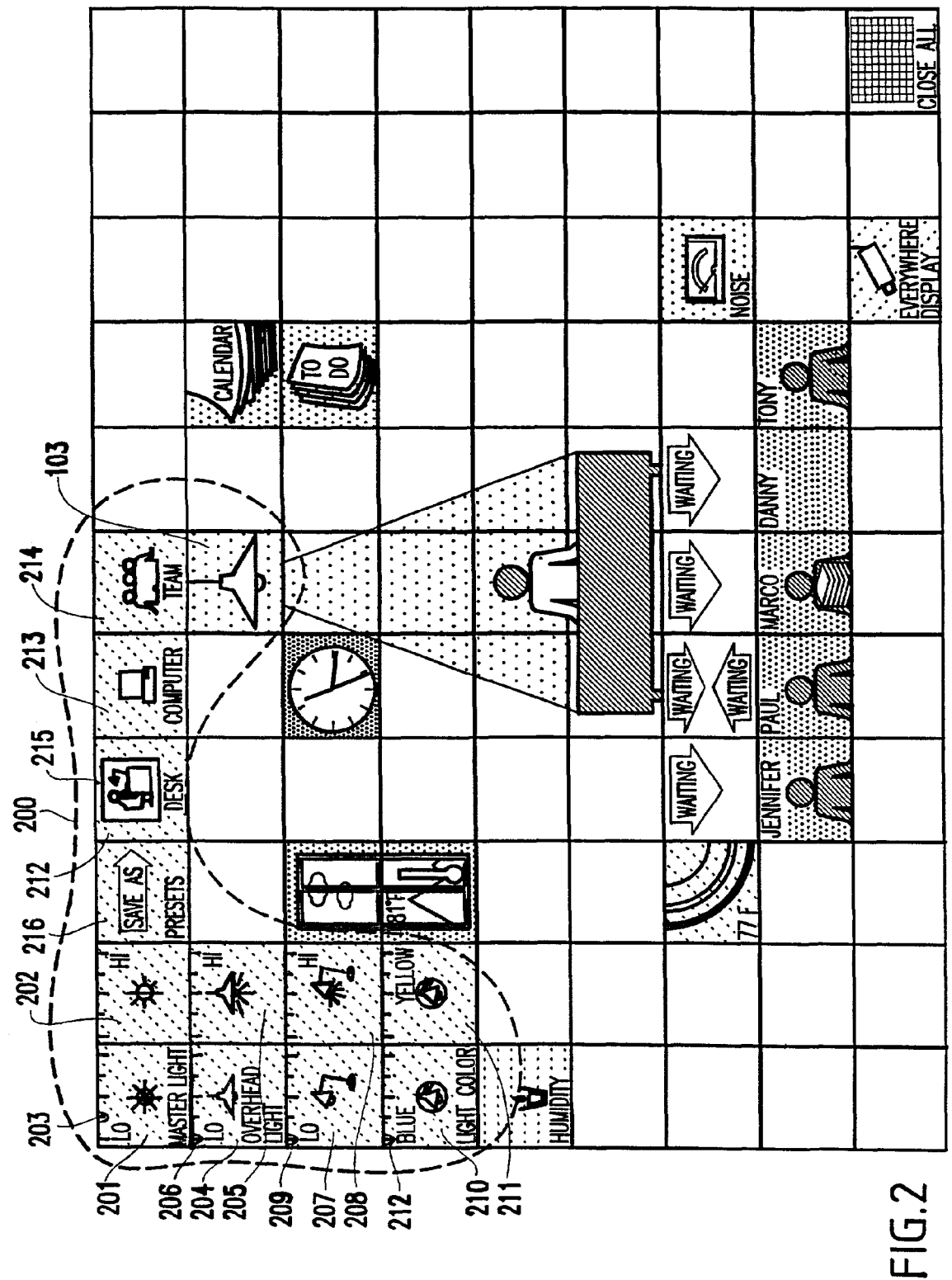
FIG. 2 illustrates the exemplary TUI of FIG. 1 having the light control tile cluster open.
Figure 10:
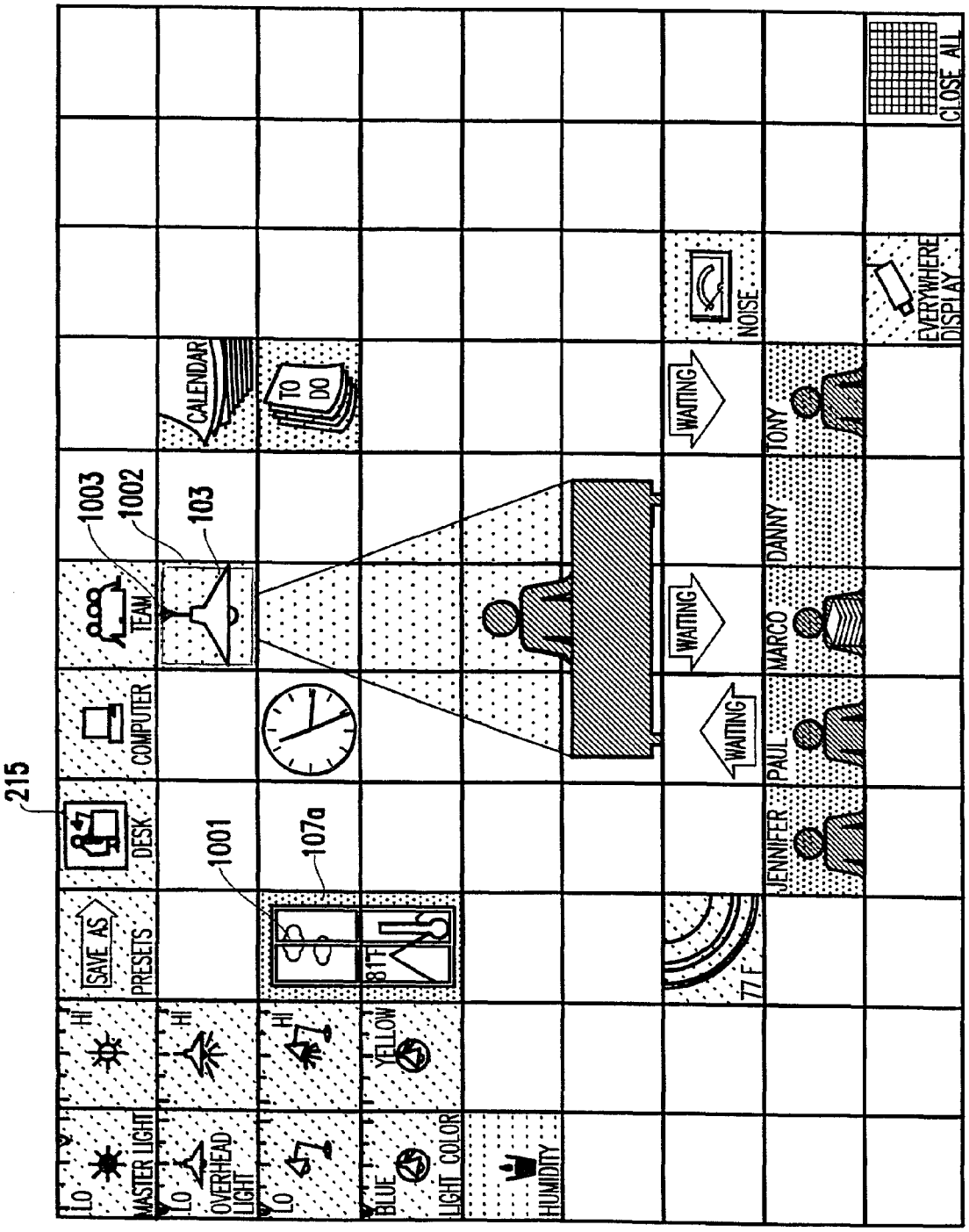
FIGS. 10-12 present additional expanded views of the exemplary office environment tiled user interface.
Figure 11:
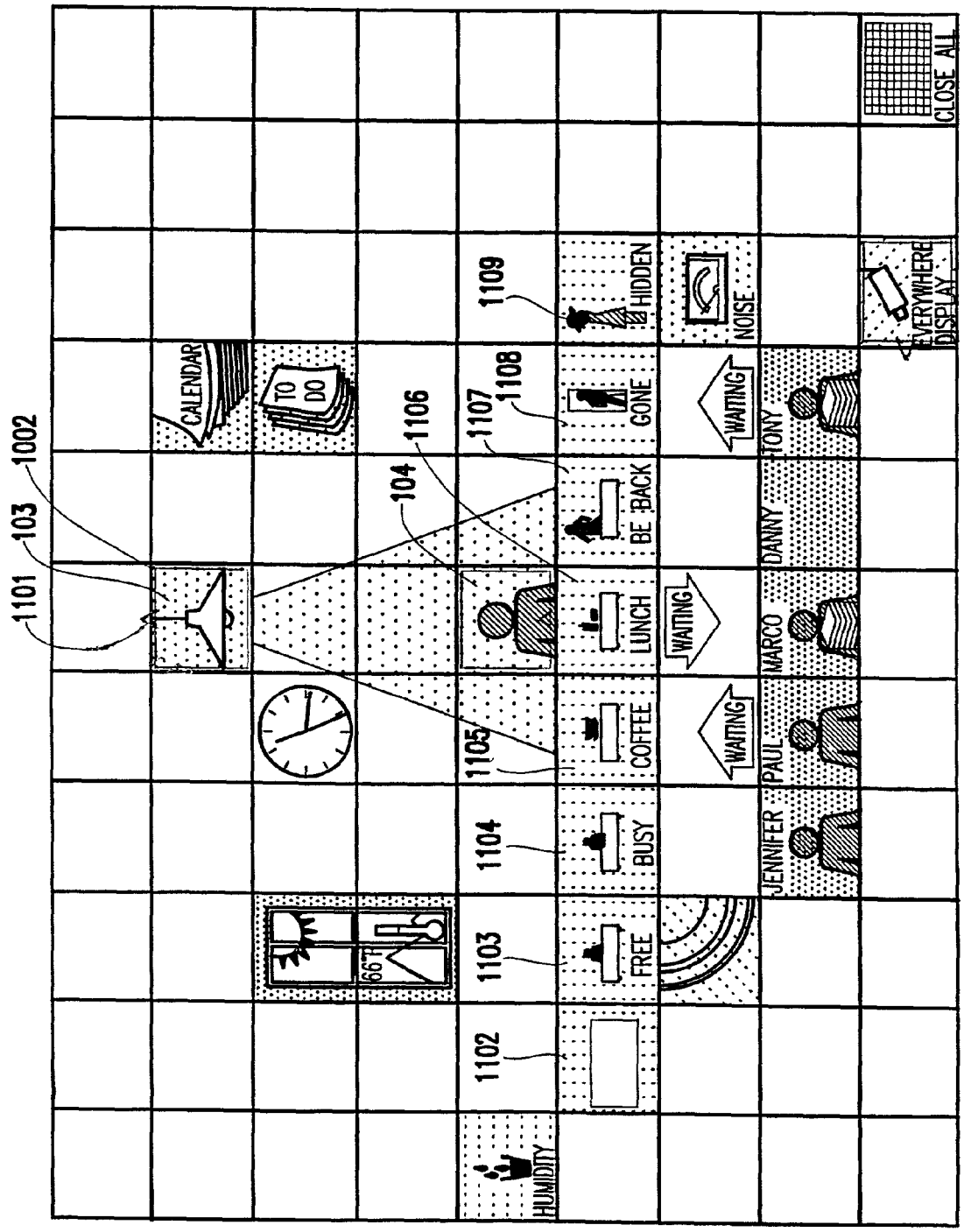
Figure 12:
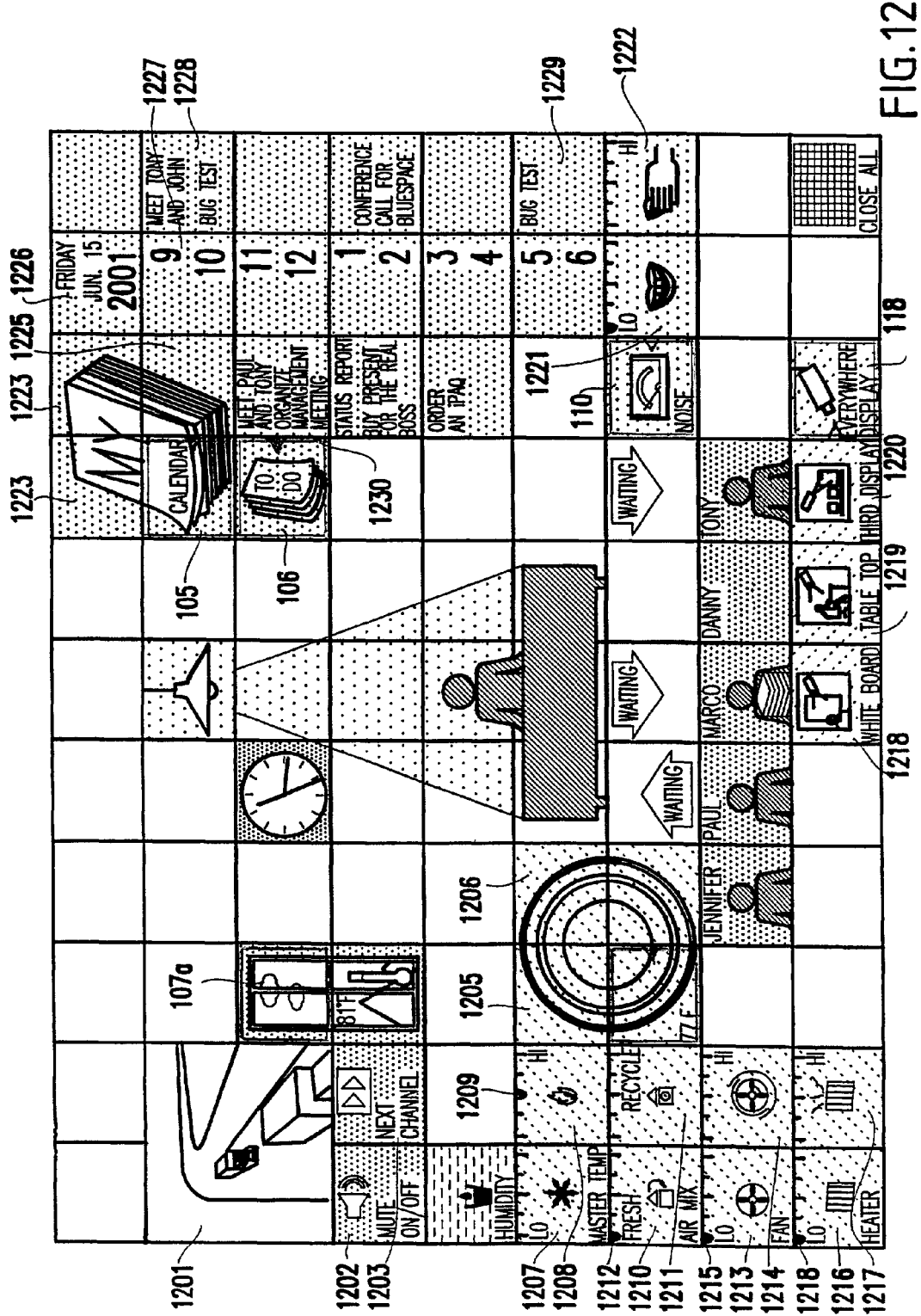

A concrete example of the concepts of the invention will be presented by examining FIGS. 1 and 2. FIGS. 10-12 also are used to explain additional features and details of this exemplary embodiment. With an understanding of this exemplary embodiment, it will be obvious that these basic concepts can be easily implemented into other specific TUIs dealing with diverse subjects. It will also be obvious that the basic concept can be implemented using isolated applications rather than a grouped into a central theme such as the exemplary embodiment with the office worker, and that various levels of hierarchy can be easily incorporated.

FIG. 1 shows the exemplary TUI in a "closed" condition, meaning that tile clusters are shown closed rather than expanded. The user has already preset this TUI to display the information and to control the parameters that the user considers particularly useful. The configuration available for any specific user will obviously depend upon the specific application interfaces available for that user. For example, one user might have one set of lights that can be controlled by the TUI, whereas another user might have an entirely different light set to interface with. One user might be able to interface to HVAC (e.g., air conditioning) effectors such as fans and heaters, whereas another has no such interfaces. Other examples of differences will be obvious after understanding the exemplary office worker TUI.

The display for a TUI might be the monitor used by the office worker as a work station. In that case, the user would execute a straight forward sequence to initiate the TUI display as an applications program selectively invoked by the user. Alternatively, the TUI might also be presented on a dedicated display. Since the exemplary TUI could be an integral part of an office environment, the display might also be placed so that passersby, visitors, and others would be able to view the display, for reasons that will become more obvious as this embodiment is better understood.

The entire display in the exemplary embodiment shown in FIG. 1 is filled up with tiles. However, this is not a requirement, as it will become apparent that a TUI need not completely fill a screen. Nor is it necessary that the TUI be composed completely of tiles. Nor is it necessary that tiles all be the same size, shape, or color. In this specific example, tiles are similarly shaped although the colors differ, which is not apparent from the black and white reproduction used in the figures.

Each square in TUI 100 shown in FIG. 1 represents a tile unit. Tiles 101 happen not to have any function associated with them, although they can be optionally preprogrammed to provide some type of response if touched, such as changing color or causing a sound or tone to be emitted from a speaker to advise the user that no function has been executed by touching that tile. Tile 102 is an icon of a clock and shows the current time. Tile 103 allows the user, represented by the figure icon 104, to control lighting in the user's environment. Tile 105 is a calendar and tile 106 is a "to do" list for the user. Tile cluster 107 is an icon representing a window and is intended to show the user the weather conditions outside. This tile cluster 107 is composed of an upper tile 107a and lower tile 107b. Upper tile 107a shows that it is sunny outside and the lower tile 107b provides the current outside temperature. Tile 108 shows relative humidity by the amount of water in the glass icon. Tile 109 shows indoor temperature with digital temperature indication 109a and analog pointer 109b.

Tile 110 shows the amount of noise in the user's environment, as represented by a dial showing noise level. Tiles 111-115 represent the current status and control of a management/"buddy list", comprised of five "buddies". The fourth buddy represented by icon 114 is currently absent from his office. The remaining four 111-113, 115 are present and the second of these 112 is waiting to meet or communicate with the user 104, as announced by the "waiting" icon 116. User 104 also wants to communicate with the first buddy 111, as announced by the "waiting" icon 117. Tile 118 controls an "EVERYWHERE DISPLAY", a projection system to be described shortly, which allows the user to project information onto a selected one of various surfaces. Tile 119 is a "CLOSE ALL" that allows the user to close all expanded tiles to return to this "closed" presentation shown in FIG. 1.

FIG. 2 shows the change in the display when user 104 actuates ("touches") lighting tile 103 by selecting the tile 103 with a mouse or any other method that allows a user to interact with a computerized display device such as a monitor. Tile 103 is actually one tile in a lighting tile cluster 200. When tile 103 is touched, the remaining lighting tile cluster 201-216 will appear on the display to provide the user a representation of the status and controls for lights in the environment. Unlike the blank tiles 101 mentioned above, each lighting cluster tile has a function related to this application concerning lighting. In general, a tile function can be a display function or a control function, or both. For example the function of tile 103 is the control of the appearance of the remaining lighting cluster tiles 201-216.

Intuitively, a user familiar with computers will recognize that, just as touching tile 103 a first time causes the remaining lighting tile cluster to appear, touching the same tile 103 a second time will cause the tile cluster to revert back to the contracted state shown in FIG. 1. Additional aspects of tile "OPEN" and "CLOSE" functions will be addressed again shortly. A second way to close lighting tile cluster back to the unexpanded state would be by touching "CLOSE ALL" tile 119.

The function of the remaining lighting cluster tiles 201-216 of the exemplary embodiment will now be briefly discussed, although it should be obvious that many variations would be possible relative to an office environment lighting control. Tiles 201 and 202 together represent status and control of the office "master light", which allows user 104 to control lights in the environment as a unit. This becomes a coarse light control for the user. Current level of lighting is indicated by the location of the marker 203. Touching tile 201 with a mouse allows user 104 to lower the lighting level in increments each time the tile is touched. Touching tile 202 allows user 104 to increase the level in increments.

Tiles 204 and 205 allow user 104 to similarly control the overhead light such as an overhead fluorescent light. Marker 206 indicates current light level. Tiles 207 and 208 provide a similar control and indicator 209 for a task light such as a small light used for desk lighting. Tiles 210 and 211 provide a control and indicator 212 for a color of the task light controlled by tiles 207-209, with color ranging from blue to yellow. The level of lighting would be typically controlled by an effector that controls the voltage level to each respective light, with the indicator providing an indication of which voltage setting is current. The color of the task light could be changed by using filters controlled by an effector or could be changed by causing different colored lights to turn on in various levels, thereby causing a change in color.

Tiles 212-215 allow user 104 to save settings for the various conditions of the environment. "DESK" tile 212 permits a setting that is comfortable for working at the desk, "COMPUTER" tile 213 permits a setting that is comfortable for working on the computer, and "TEAM" tile 214 permits a setting that is comfortable for a group of people working together in the user's immediate environment. User 104 makes a setting to one of these three tiles 212-214 by adjusting the light control tiles 201-211 to a desired setting for a desired one of these three conditions and then touches "PRESETS SAVE AS" tile 215 followed by touching one of tiles 212-214. Once the setting has been preset, user 104 can then touch that tile 212-214 in the future to have that selected lighting condition turned on automatically.

In FIG. 2, tile 212 has a faint white square 215 indicating that this is the currently selected light condition. This faint white square 215 shows up better in FIG. 10, which also demonstrates some additional features of this exemplary embodiment. For example, the weather icon 1001 in the upper tile 107a of the weather tile cluster now shows a "cloudy" icon rather than the "sun" icon shown in FIGS. 1 and 2. The weather icon and outside temperature could be controlled in a number of ways. A preferred method is that of using data from a webpage that lists current conditions for a preselected site.

FIG. 10 shows another important feature in better detail than is visible in FIGS. 1 and 2. FIG. 10, like FIG. 2, shows the expanded lighting cluster. The white outline 1002 around tile 103 indicates to the user that touching this tile is one way to close this expanded lighting cluster to return to the closed display shown in FIG. 1. Thus, a white outline is used to indicate that touching that tile will contract the expanded tile cluster. Further, the small arrow 1003 shown at the top center of tile 103 that points inward, indicating that the associated tiles will contract (disappear) if that tile 103 is touched. The inward-pointing arrow 1003, therefore, is a clue that this tile 103 is ready to perform a "CLOSE" function if touched and serves as a "close tab".

The reverse operation is the expansion, or "OPEN" function, which is better seen in FIG. 11, which again shows lighting tile 103 with a faint white outline 1002 around the periphery of the tile. Also faintly visible is the "OPEN" tab 1101 which shows up as a small arrow pointing in the direction in which the tile cluster will open. Any tile having an outward-pointing arrow serves as the method to open that tile cluster.

A tile cluster may also contain a hierarchy of tile clusters that expand upon subsequent selection, providing a recursive feature to tile clusters. For example, if a designer or user chooses to have a top-level custom-designed tile cluster to provide capability to interact with lighting and temperature, the top-level tile cluster might contain two tiles, one for each of lighting and temperature applications. Upon selection, the selected one would expand to a next level tile cluster dealing with the selected application, such as display of temperature sensors. Selection of one of these second level tiles might then expand into a control level to control one or more parameters associated with that temperature sensor.

This last example demonstrates that, even though it makes most sense that tile clusters relate to a single application, it is entirely possible for the operator or designer to mix applications and/or hierarchy in a custom-designed tile cluster. Indeed, a tile cluster itself can be custom-designed so as to relate to multiple applications rather than a single application or to multiple levels of hierarchy rather than one level.

FIG. 11 also shows how user 104 can change the current status to be shown as part of the "buddy list". Touching tile 104 causes the white outline and "CLOSE" tab to appear, along with the remaining tile cluster 1102-1109. By selecting tile 1102, user 104 can type in a message. Selecting tile 1103 announces that user 104 is currently free, which is the status shown in FIGS. 1, 2, and 10. Selecting tile 1104 announces that user 104 is currently busy, an icon representing a person working on a stack of paper. This "BUSY" status has been currently selected by "Marco" and "Tony" in FIG. 11. Status tiles 1005-1107 are self explanatory. Tile 1108 indicates the person is gone for the day. Tile 109 indicates the person is around by prefers not to announce anything more to office buddies. Selecting one of these status tiles 1102-1109 allows user 104 to change user tile 104 to that selected status. Touching tile 104 will then close the tile cluster.

FIG. 12 shows additional features of the exemplary TUI embodiment. In this variation, touching the upper outside weather tile 107a causes the tile cluster to expand to include a four-tile video of the current outside weather/road conditions, a display easily achieved by an interface with a remote video camera at a preselected location. Note the "CLOSE" tab around the upper tile 107a during this expanded mode. Also part of this tile cluster are tile 1202, which mutes audio from the video source, and tile 1203, which allows a selection from multiple video channels.

Touching indoor temperature tile 109 (see FIG. 1) causes the indoor temperature tile cluster to expand as shown by tiles 1204-1217 in FIG. 12. Tiles 1204-1206 complete the analog temperature indicator. "MASTER TEMP" tiles 1207 and 1208 allow overall temperature control by touching tile 1208 to increase and tile 1207 to decrease temperature in increments, as indicated by pointer 1209. "AIR MIX" tiles 1210-1212 allow a control and indication for outside/inside air mixture. "FAN" tiles 1213-1215 control and display a fan and "HEATER" tiles 1216-1218 control and display a radiant heater in the immediate environment of the user. The white outline and "CLOSE" tab on the left edged of temperature tile 109 indicates that pressing indoor temperature tile 109 a second time causes the temperature tile cluster to contract.

The "EVERYWHERE DISPLAY" tile cluster includes tiles 1218-1220. This display controls a projector that can project an image on a white board in the user's environment (tile 1218), a table top (tile 1219), or another display (tile 1220).

"NOISE" tile cluster includes the "OPEN"/"CLOSE" tile 110 having a noise level indicator as an icon embedded in the tile as well as a white noise generator control/indicator tiles 1221 and 1222. The generator output is increased by tile 1222 and decreased by tile 1221. "CALENDAR" tile 105 expands into tile cluster 1223-1229. Tile 1226 indicates the current date with times of the day indicated below beginning at tile 1227 with appointments indicated in appropriate adjacent tiles 1228, 1229.

As a representative tiled user interface, the exemplary TUI 100 demonstrates the that TUIs 100 consist of a matrix of at least two inter-related tiles. In any given TUI some tiles may be blank tiles, and each of these blank tiles may or may not have a function linked with it. Other tiles will have an embedded preprogrammed function comprising one or both of display of information and/or control of an effector and will usually have some type of iconic image as a surface appearance. Unlike ordinary windows, there are no menus in TUIs associated with the window, nor are there any controls for the window itself (e.g. close, minimize, maximize). The primary tile of a tile clustor has small 'tab' on the periphery edge indicating that the tile is expandable/contractable. The tiles of the present invention are predefined in size and shape by the TUI developer, although the developer can allow the TUI user to modify this size and shape. While all the tiles in the example are divided by a black border, a TUI is typically set up so that the user recognizes tiles as belonging to the same tile cluster because they share a common color, shape, marking or simply by adjacency.

A significant feature of the presentation philosophy of the present invention is that the expanded tiles can be designed to show all information/control for the corresponding application. Unlike conventional window systems in which the user must navigate to various levels to access the entire application, in the present invention the additional tiles would then show all related functions of the application. Thus, in the present invention, a single click would allow the user to see all functions related to an application so there is no need to navigate through multiple menus to see all the functions or information.

These expansion examples also demonstrate how tiles are designed to be linked into a tile cluster based on application, such as room lighting. In this example, the newly-appearing tiles of the lighting tile cluster are overlaid onto blank tiles of the original display. However, it should be obvious that tile clusters could expand to overlay other tiles without serious loss of information. For example, no information would be lost if a tile of the lighting display should cover a tile representing a corner of the desk. It should also be obvious that a TUI could be based on a priority scheme in which the most recently expanded tile cluster simply overlays whatever tiles happen to be in the background.

It should also be obvious from the office worker example that a TUI will typically be designed around a central theme that has multiple applications. A key feature of the present invention is this ability to display a multitude of applications so that the user has access to significant information at-a-glance without having to navigate around to find it.

From this brief example, it can be seen that the tiled interface of the present invention includes a set of tiles with the following characteristics.

For example, all tiles can potentially be activated by touch and have an associated behavior when activated. This is the basic mode of interaction in a TUI. A tile can be thought of as a "button" that can be pressed to achieve some desired system behavior. This desired behavior may take some direct action, such as changing the value of some variable such as fan speed. The desired behavior might also cause a change of the activated tile(s) into a different type of tile or set of tiles or some other reconfiguration. As examples, a selected tile may expand to introduce another set of tiles revealing new or extended function, such as the lighting example described above. The action might cause a set of tiles to be hidden. As an example from FIG. 1, the close-all tile will cause all expanded tile clusters to contract to the unexpanded display, thereby hiding tiles from the user. Additionally, any of the expandable tiles have a toggle behavior, so that, if touched when expanded, they close. The action might cause the tile set currently viewable to completely reconfigure.

A tile may present information to the user in a variety of ways. As examples, a tile might show the current temperature (textual or iconic), a web cam shot (pictorial), or an icon that reveals some information such as hand-drawn rainy clouds to indicate that it is raining outside. A tile could also provide an auditory output/feedback.

Expanding the function of the selected interface is a simple matter of adding tiles that introduce the new system function at a particular location on the display and linking in the associated behavior.

Personalization can be achieved by dragging the tiles around to reconfigure the image that the tiles form when together. Personalization can also be achieved by adding or deleting tiles, as well as changing shape, size and color of the tiles.

Tiles could all be identical, for example, in size and shape—all square, triangular, hexagonal, etc.

Tiles could lay on a Cartesian grid, that is, evenly spaced on a matrix.

Tiles could combine with other tiles to form larger regions for input and output.

Tiles could be of different sizes and shapes, resulting in different geometric layouts.

Tiles could dynamically combine to generate larger regions.

Tiles could dynamically subdivide to generate smaller touchable regions.

Color could be used to show tile's affinity group. For example, yellow tiles might relate to temperature control. Adjacent or close-together tiles might indicate affinity. Shape could be used to show a tiles affinity group. For example, all hexagonal tiles might control lighting. Symbols on tiles might show an affinity groupness. For example, all tiles with a tab either control or indicate something. There are two exemplary types of control tabs. Those that point outward indicate that touching causes expansion to occur in the direction they are pointing. Those that point inward indicate that they collapse the tile cluster. However, it is easy to extend this aspect of the invention in which other types of markers would denote classes of behavior that touching would invoke.

Symbols on the tile may be used to indicate generic tile behavior. For example, a tab pointing outwards indicates expandability. A tab pointing inwards indicates "press to close along with associated tiles". As another example, based in color or shape, all tiles having that specific trait could expand/contract as a unit when touched.

If not all tiles are actionable, a symbol on tile can indicate which ones causes an action.

Tiles need not be represented as a two dimensional matrix or in a two dimensional universe. For example, tiles could be represented in a three-dimensional space of some sort. As an example, the display could be a representation of a three-dimensional matrix wherein the user can select and view a slice that moves to become the foremost two dimensional view of the three dimensional matrix. Another example could be a three-dimensional matrix shown in a representation similar to a Rubic's cube or a tilted geodesic ball. Selection involves selecting a cube on the surface of the Rubic's cube or ball and discovery of additional functions is performed by rotating the Rubic's cube or ball so as to reveal other sides of the three-dimensional surface.

Functions could be expanded by adding tiles to a tile cluster.

Figure 3:
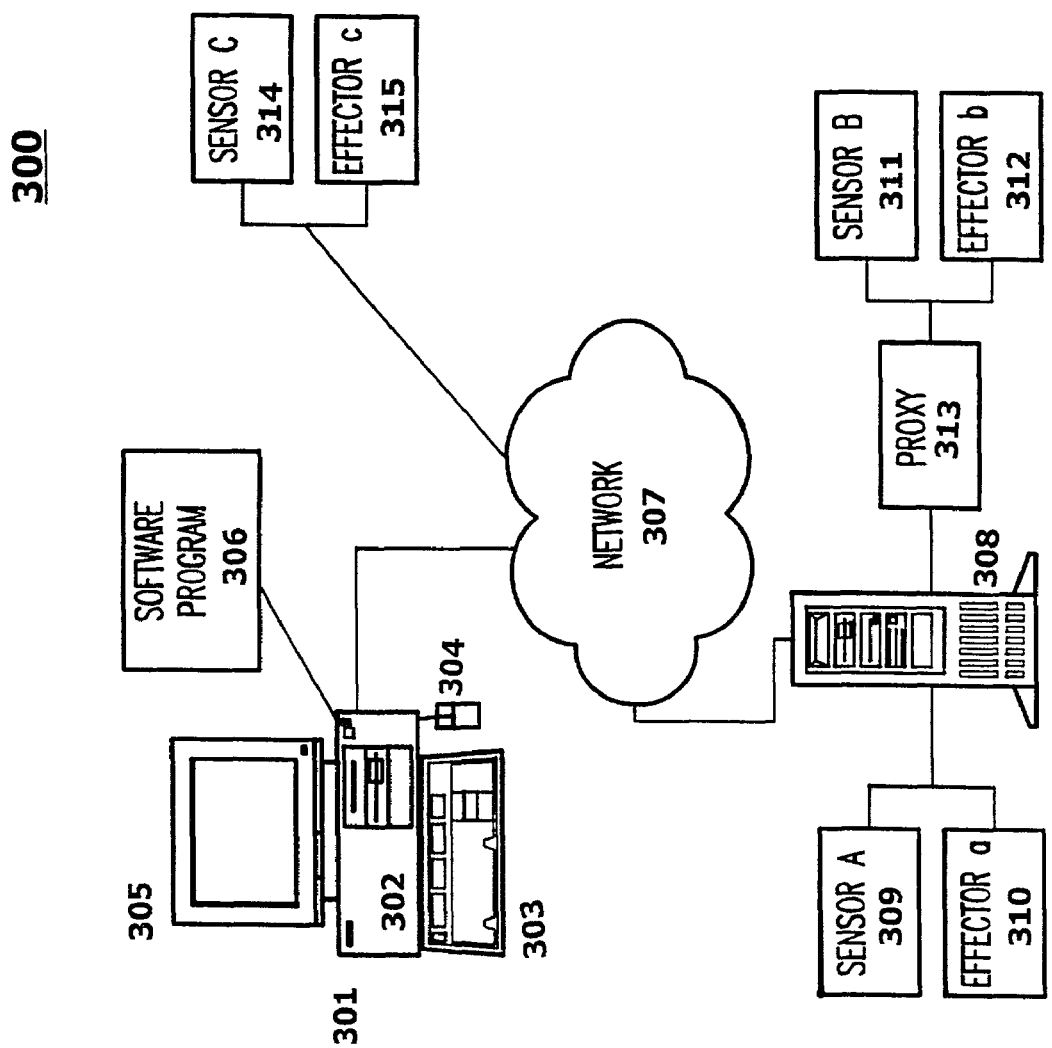
FIG. 3 illustrates one possible example of the environment for the tile interface system of the present invention.

FIG. 3 (as well as FIGS. 13 and 14 described below) illustrates a preferred embodiment of the environment 300 for the tile interface system of the present invention that would implement the example TUI shown in FIG. 1. Computer system 301 provides a user interface that can show information-at-a-glance and control tile behavior as well as remote devices and effectors. For example, as shown in FIG. 1, the system concerned the immediate environment along with a host of other parameters such as occupant status. Computer system 301 could be comprised of computer 302, input devices such as a keyboard 303 and mouse 304 and output devices such as a visual display device 305. A speaker and microphone, as well as any number of other interface components could be added. The visual display device 305 could also provide input capability by means of, for example, a touch-panel display (not shown) located on the display device. Computer system 301 contains software program 306 which includes computer instructions of the present invention. Computer system 301 is shown in this example as being connected to network 307, using a standard communication protocol such as TCP/IP and HTTP.

A second computer system 308 is a Workspace Appliance that provides Workspace Communication, Monitoring and Control Services, and has devices such as sensors and effectors connected in various ways. As generic examples, sensor 309 and effector 310 are connected to computer system 308 via computer serial ports. Additional sensor 311 and effector 312 that support a proprietary protocol not supported by computer system 308 could also be provided. Proxy 313 provides the necessary interface with sensor 311 and effector 312 to translate between the proprietary protocol and the standard protocol used in computer systems 301, 308, the network 307. Further, in this example, sensor 314 and effector 315 communicate with the Workspace Appliance 308 over the network 307 via a standard protocol.

The Workspace Appliance 308 collects data from sensors 309, 311, and 314. For example, temperature, light, humidity, and/or noise data may be collected from these sensors. The Workspace Appliance 308 also controls effectors 310, 312 and 315. The effectors may be used, for example, to control air conditioning, lighting, and/or a noise masking device.

Software program 306 communicates with the Workspace Appliance, and can receive inputs and display information on screen 305. The software program 306 can also generate control information for effectors under the control of the Workspace Appliance 308. The function and connectivity of the Workspace Appliance 308 could also be subsumed by computer system 301, if it is sufficiently powerful to handle the required processing.

As demonstrated by the exemplary office worker embodiment, the present invention is intended to receive data input from a variety of sources, including remote sensors such as thermal sensors or remote video cameras. Other data, such as user status, originates within the invention itself Still other data, such as calendar and "to-do" items, can originate from other applications programs that are outside the invention but from which the invention extracts data for the application presentation on the TUI display.

Figure 4:
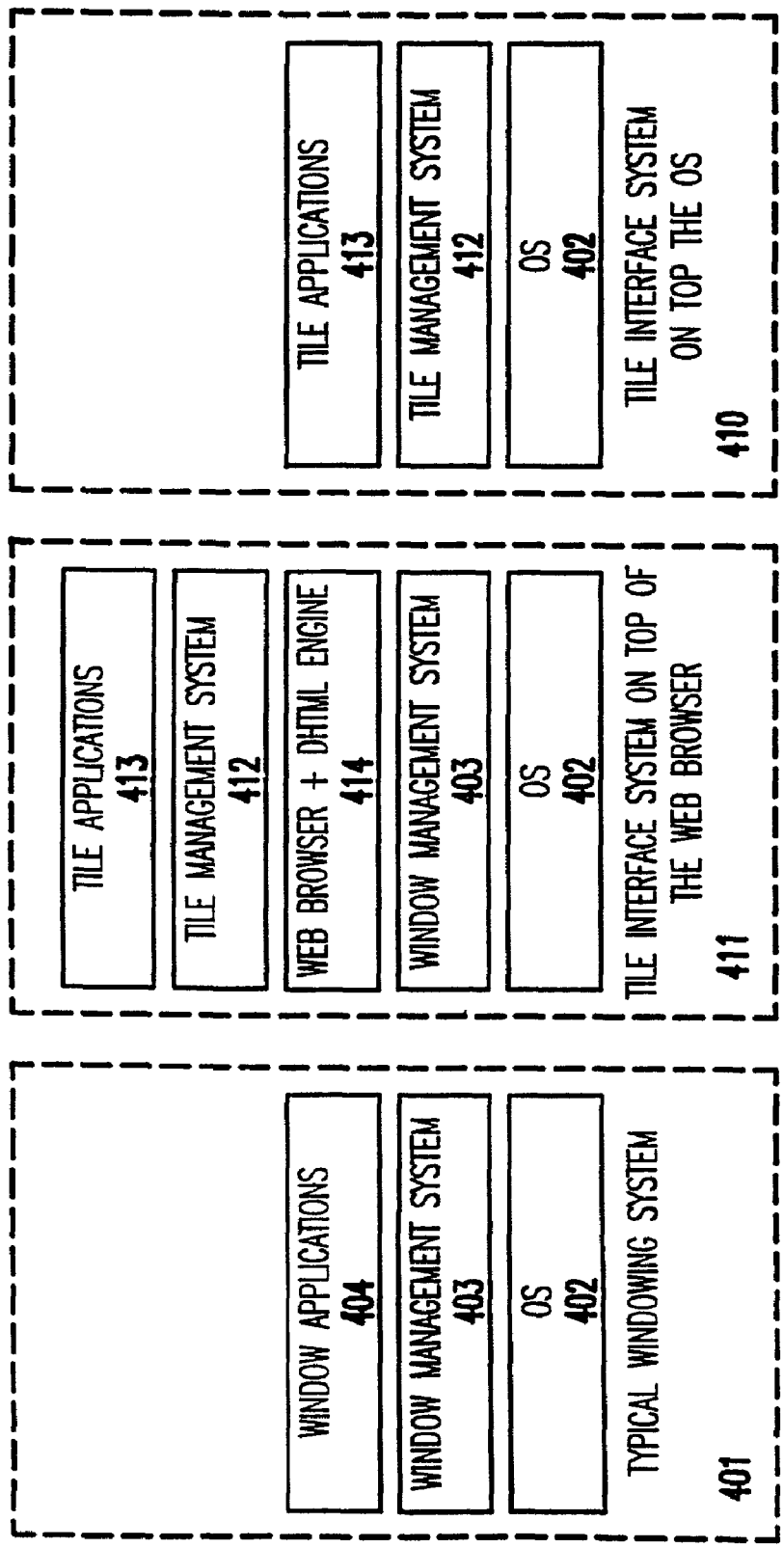
FIG. 4 illustrates two exemplary methods to implement the tile interface system of the present invention into existing operating system models.

FIG. 4 shows how the tile interface of the present invention could fit into existing computer software structure. A conventional windowing structure 401 is comprised of a window application 404 riding on top of window management system 403, which in turn rides on operating system 402. Two exemplary software structural embodiments of the present invention are shown as 410 and 411.

In exemplary embodiment 410, the tile interface system is implemented directly on top of an operating system 402 and is comprised of the tile management system 412 of the present invention. Tile management system 412 allows an application developer to develop and implement tile applications 413. Once tile applications 413 are implemented, the tile management system 412 controls the operation of these applications by the application user.

Exemplary embodiment 411 is similar to embodiment 410 except that tile management system 412 rides on web browser/DHTML engine 414, which in turn rides on window management system 403 and operating system 402. Note that the exemplary embodiment 410 does not use a window management system 403 in order that a TUI can be implemented on top of light-weight operating system such as an operating system used on small devices that do not have built-in window management system.

Figure 5:
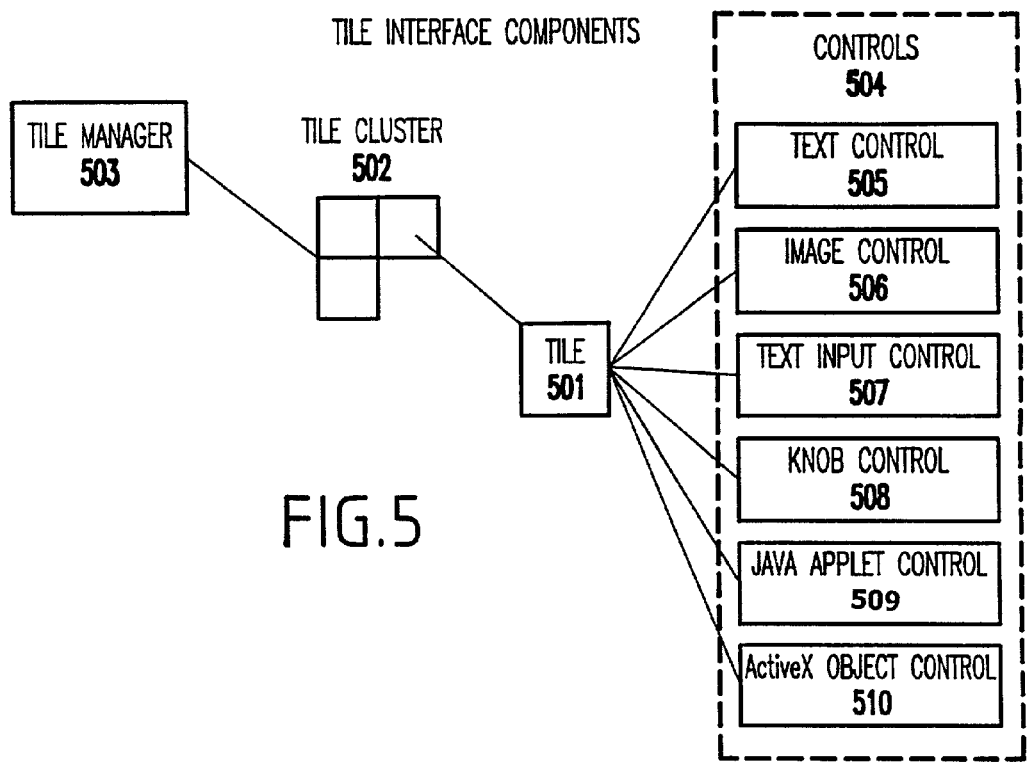
FIG. 5 illustrates the building block components of the tile interface system.

FIG. 5 illustrates the tile interface components 500. The three basic components are tiles 501, which can be grouped to form tile clusters 502, under the control of tile manager 503. A tile 501 is the essential building block of the interface. Each tile 501 may have one or more controls 504 that establish graphical, textual and interaction capabilities for that tile.

These controls, for example, enable an application developer to create an iconic representation of the tile through the image control 506 or display text on the tile through the text control 507. The text input control 505 provides an application a means of accepting text input using an input device such as a keyboard. The knob control 508 allows the user to see and control the value of relevant parameters. For example, an application may provide a means to control the temperature of an air conditioner using a knob control simulated on a tile. The tile having the temperature control might also indicate the value of the current temperature setting.

Further, controls may be used to embed software objects. For example, Java applet control 509 embeds a Java applet. The Activex object control 510 may also be used to embed an Activex object.

In the exemplary embodiment shown in FIG. 1, the clock is a Java applet, and the webcam image of FIG. 12 is an ActiveX object. By embedding these objects, the TUI developer can utilize external software components provided by the third party, and the components behaves in a manner as other tile clusters do, for example, the webcam image will be expanded when the user touches 'outside view' tile.

A tile may be any shape such as a square, rectangle, polygon or circle. The programming technique is also very trivial for those familiar with windows programming. Tile Manager, Tiles, Tile clusters, and controls are implemented as objects, and these objects are internally stored as nodes in the tree structure. For example, the Tile Manager has one or more tile clusters. Each tile cluster has one or more tiles, and each tile may have one or more controls.

Each object has properties and methods. For example, a Knob control's property includes its name, position (as relative X and Y position from the top left corner of the tile it belongs to), icon images to be used to show the value of the knob, the minimum and maximum value the Knob may represent, and its current value. The object also exposes its function using its methods. For example, getValue and setValue methods retrieve and set the value of the Knob, and by calling paint method, the object renders itself.

How the object behaves when the method is called is encapsulated in the implementation of the object. Tiled interface implemented on top of Web browser uses DHTML mechanism to realize the function. For example, an Input-Control object, which represents text input field, uses the HTML input element to represent itself. By calling the paint method, it layouts itself using stylesheet associated with the HTML document. The absolute position of the control is calculated from the position of the parent (a tile the control belongs to) and the control's relative position. Also, the getValue and setValue methods access the value in the text input field using DOM interface of the HTML element provided by the DHTML engine.

A Tile Cluster 502 is a grouping of one or more tiles that usually perform some common function. This function can be thought of as an application. For example, temperature, lighting, or status clusters as seen on FIG. 1 can each be thought of as a separate application concurrently residing on the display screen. However, a tile cluster can also be designed to involve multiple functions so that, for example, lighting and temperature are incorporated together in a single tile cluster. A tile cluster could also be designed to involve multiple levels of hierarchy.

A typical tile cluster is designed so that it can be represented by a single "top-level" tile. Upon activation (by touch or click), the "top-level" tile will expand into multiple tiles exposing additional function(s) to the user. In this manner new applications can be easily added by the application developer or application user to an interface and occupy minimal real-estate when not needed.

Tile manager 503 is responsible for the management of tile clusters on the display screen. It manages tile layout, and mediates interaction between the user, tile clusters and tiles.

Figure 6:
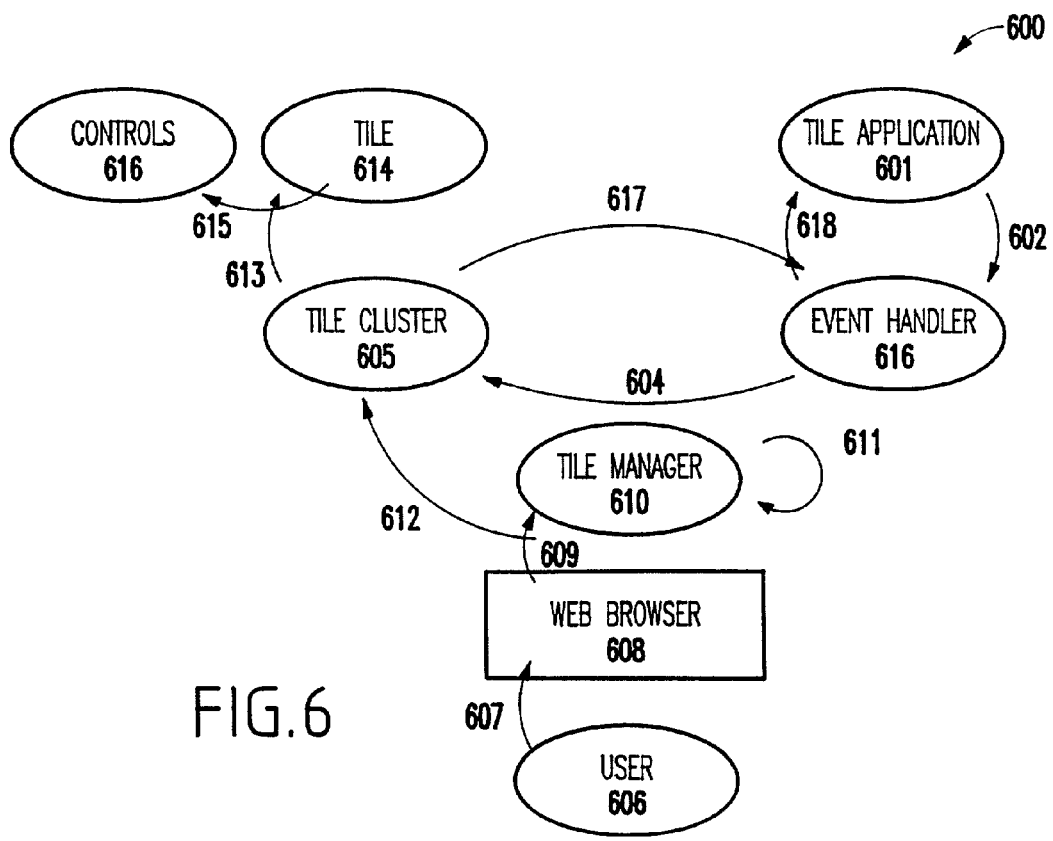
FIG. 6 illustrates the tile interface event propagation mechanism of the tile interface system.

Referring now to FIG. 6, the tile interface event propagation mechanism 600 shows the basic mechanism used by the tile interface system to process user interactions. Tile application 601 first creates (step 602) one or more event handlers 603. Each event handler 603 is then registered (604) with a tile cluster 605. When a user 606 generates an interaction 607 with the Web Browser 608 using some input device such as mouse or touch-panel display, the interaction 609 will be sent to Tile Manager 610 as an HTML event. The Tile Manager 610 translates the event (step 611) into a Tile Cluster event, which has richer information specific to the Tile Interface System. This can describe, for example, the tile and on what location in the tile the event occurred. Following this, the Tile Manager forwards the event 612 to the Tile Cluster 605. The Tile Cluster 605 propagates the event (step 613) to the Tile 614 on which the event occurred, then the event is propagated (step 615) to the Controls 616 where it is handled. Tile Manager 610 also passes the event (step 617) to the Event Handler 603 which was previously registered. The Event Handler 603 communicates this event (step 618) with the Tile Application 601 to further process the application specific logic.

Figure 7:
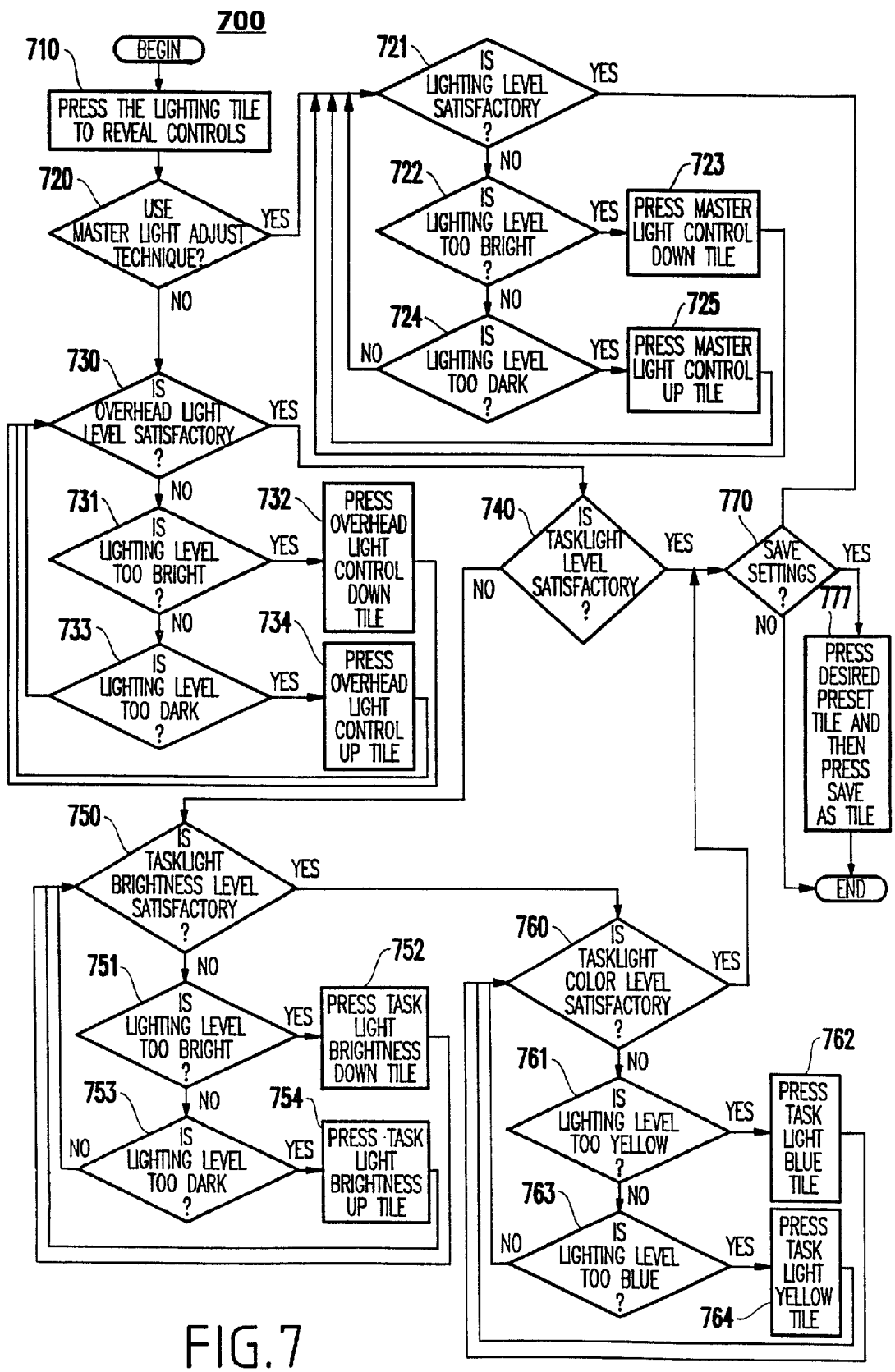
FIG. 7 is a flowchart illustrating the steps for user interaction with the lighting tile cluster shown in FIG. 2.

FIG. 7 illustrates the possible interactions for controlling office lighting through a process flow chart (700). The user begins by touching the tile that has the light icon (103) on it (step 710). This reveals the set of lighting tiles as shown by 200 in FIG. 2. The user can employ two methods to adjust the office lighting. They can use the Master Lighting approach (step 721 through 725) that controls all the lights at once or can adjust each of the lighting parameters individually for fine control over lighting. Using the Master Lighting approach the user presses the Master Down and Up Tiles (201, 202). This results in adjusting all lighting parameter up or down by a fixed amount. This can easily accomplish gross lighting changes but does not afford fine control since all parameters are simply adjusted up or down.

For fine control over lighting, the user can adjust each relevant light parameter individually. For example, process steps 730-734 show how the overhead lighting brightness can be adjusted by pressing the Overhead Down (204) or Up (204) Tile. Similarly, Task Light brightness can be adjusted by following steps 750 through 754. Following steps 760 through 764, the user can also adjust the Task Light color temperature. This allows the user to simulate outdoor lighting sources, such as sunlight, or other kinds of lighting. Finally, the user can save the current light setting as a preset (771) and recall it in the future by pressing the "Save-As" tile followed by the preset Tile used to recall this setting in the future.

Figure 8:
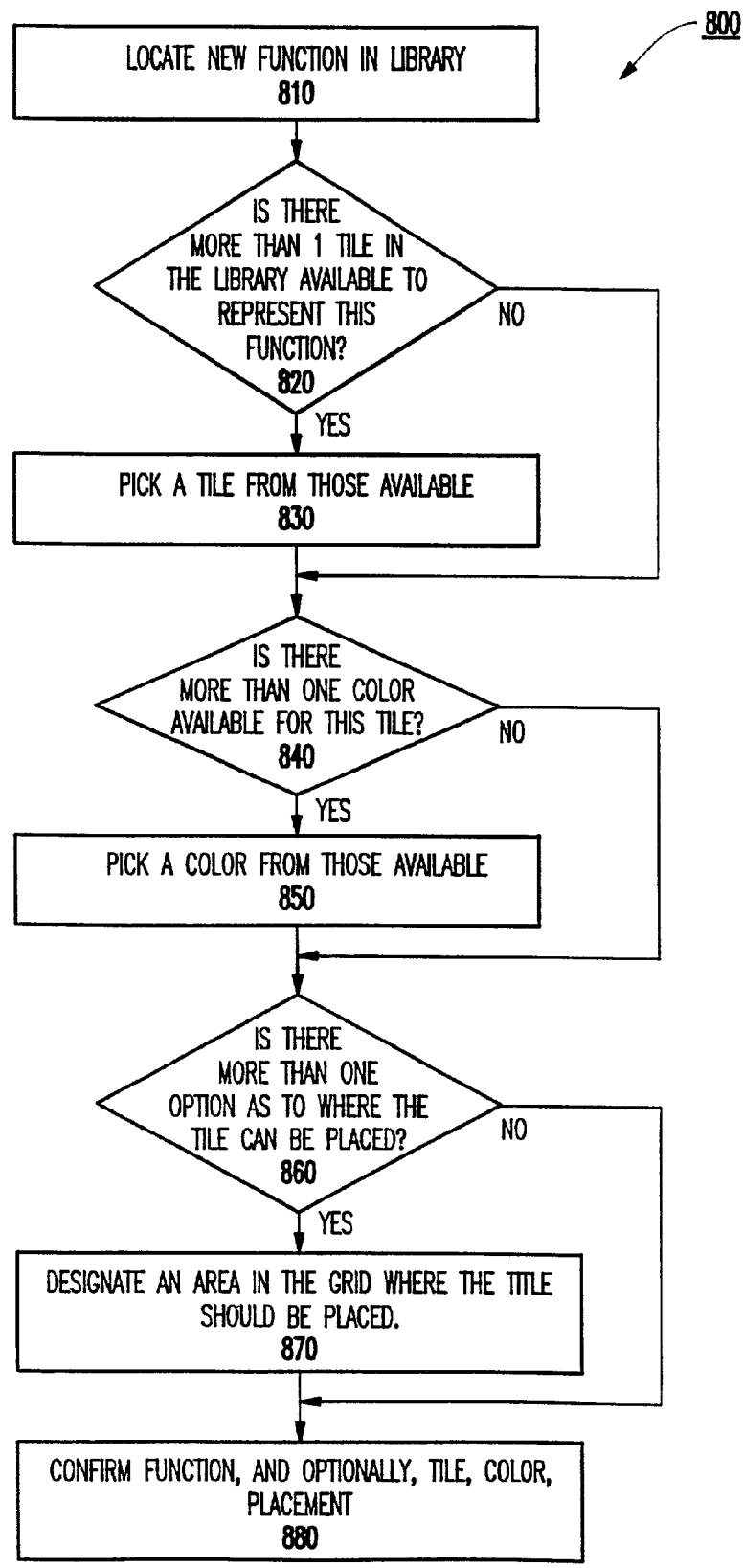
FIG. 8 is a flowchart illustrating steps a user would use to add new functions to an existing TUI.

FIG. 8 shows one possible procedure allowing a user to add additional functions to an existing TUI. This procedure would employ a "setup" mode that allows a user to interact with a library of preprogrammed optional functions. Once in the setup mode, the user scans through a listing and selects one (step 810) and makes selections for tile characteristics (steps 820-850) and location (steps 860-870) and confirms function and characteristics (step 880) prior to leaving setup mode.

Figure 9:
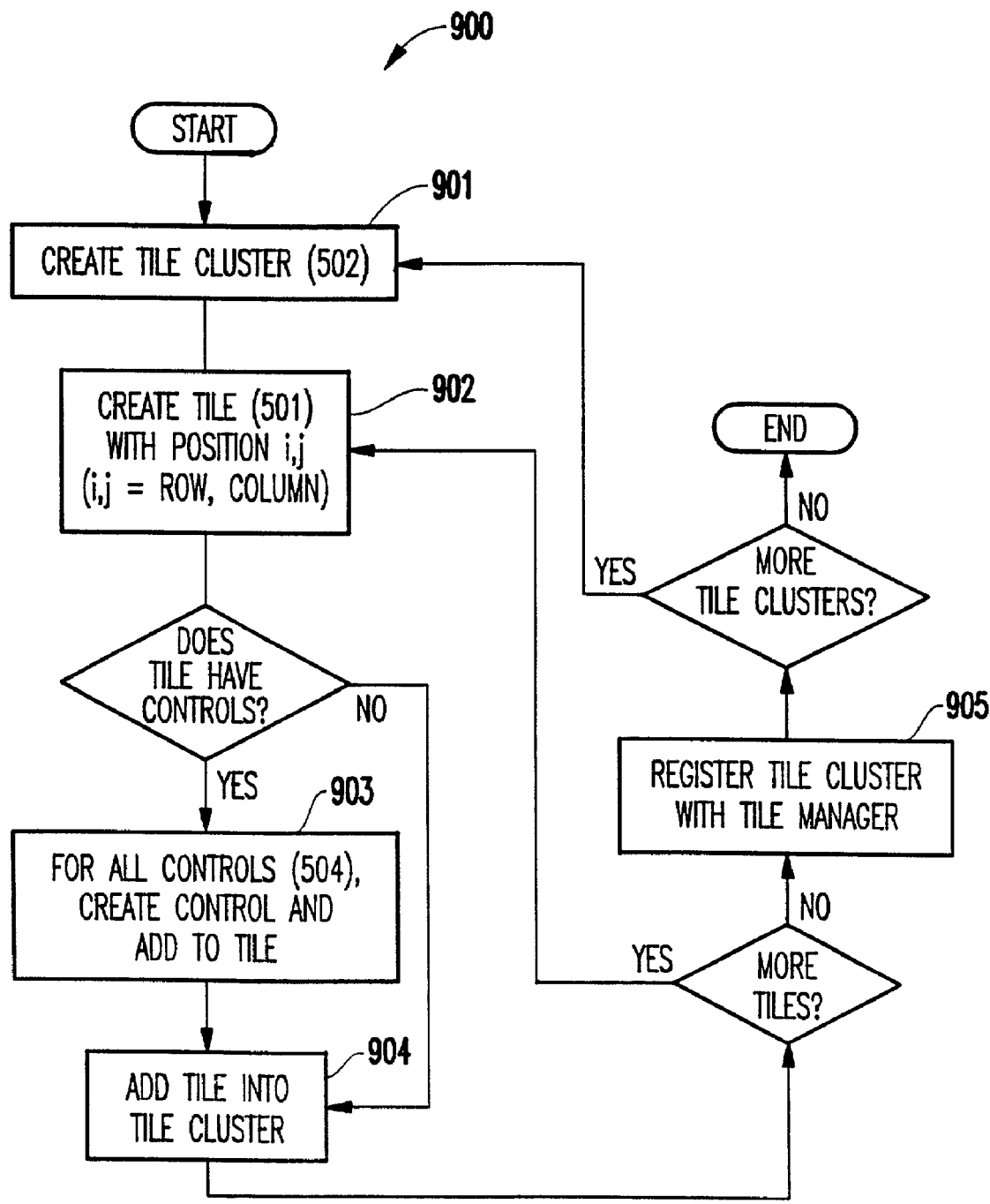
FIG. 9; is a flowchart illustrating steps a TUI developer would use to set up a new TUI.

FIG. 9 shows an exemplary procedure that would allow an applications developer or advanced user to program new applications not already in a library of preprogrammed functions. In effect, this procedure would be used to create new tile clusters with an associated set of functions. This process would also be used to develop an entirely new TUI. The process begins by creating each new tile cluster (step 901) by defining individual tile characteristics such as shape, color, location, etc., for each tile in the cluster. The developer is guided through this process by a set of instructions and cues that allow a selection of options or entry of other data at each step in defining tile characteristics. Likewise, the developer is guided by a set of instructions to define controls and functions for each tile (step 903). For some controls the developer may have to write an original series of computer instructions in a programming language such as JavaScript. In step 904, each tile's relationship to the tile cluster defined and in step 905 the tile cluster is registered with the file manager.

In developing the present invention prototype, the tile management system of the present invention was implemented on top of JavaScript/DHTML on the browser. Since the mechanism is independent of the application logic of the InfoPanel, this mechanism can be used for other browser-based applications.

The basic function of the tile management system is to manage one or more tile clusters, each of which consists of one or more tiles. Unlike ordinary windows system, a tile cluster does not have to be a rectangle. Tiles in a cluster can be adjacent or separated by blank tiles.

The tile window system encapsulates basic window behavior in its code so that the application writer can concentrate on the application logic. An applications developer can write their own event handlers to handle events which occurred on tile windows. The window management system has its own Timer handling mechanism on the top of Javascript/DHTML framework.

Implementation Elaboration

Dynamic creation of the elements:

The current version of DOM (Document Object Model) implemented by popular browsers does not support dynamic creation or deletion of the most of HTML elements. Browsers which support DHTML include IE4.x, IE5.x, and Netscape Navigator. Note that IE6 supports standard DOM so it should support dynamic creation of document elements. DHTML supports dynamic creation of some HTML elements as the option element.

Thus, developers have to write (either statically or dynamically) all the HTML elements when they write script code which interacts with the user. The Tiled Interface System of the present invention provides developers a mechanism to create logical windows and widgets. Then it outputs all the HTML elements which is necessary to represent these windows and widgets.

The fact identified above makes it difficult to write script code which is generic and reusable. It is also difficult to encapsulate procedure within the script code because the developer has to have prior knowledge of what HTML elements the script code deals with. There is also possibility of the namespace conflicts. For example, a script library code may use a particular HTML ID (attribute) to identify and operate a widget represented by an HTML element. So that the developer may not be able to import multiple script libraries if they use the same HTML ID.

The Tiled Interface System of the present invention provides a set of reusable components over which developers or advanced users can build tile cluster applications. Basic presentation mechanism is encapsulated in the components code. Since all the HTML elements are created dynamically as logical windows and widgets created by the developer, these components do not use any fixed HTML ID.

The following behavior is supported by the Tiled Interface tile clusters.

Layout of the window tiles
Opens the window (expand tiles by touching visible part)
Closes the window (close expanded tiles)
Shows expandability tab while the window is closed, or hide otherwise
Shows close tab while the window is open, or hide otherwise
Gives user feedback while the tile is touched (e.g., show pressed 3D button-like image while the user touches the tile)
Window overlapping (opened or touched window comes topmost)

This behavior decouples application logic from presentational behavior so that developers or advanced users can concentrate in the application logic.

Any HTML elements or objects which can be embedded in HTML may be handled as widget or 'controls', in the Tiled Interface System. Basic behavior (e.g, positioning, overlapping, open, or close) of these controls are encapsulated in the Tiled Interface System. Following is a sample of controls supported by the invention:

Text control
Image control
Text input control
'Knob' control
Java applet control
Activex object control HTML event handling mechanism supported by DHTML invokes event handlers in the global context. So basically developers or advanced users have to write a number of global event handler functions as number of events they handle. The Tiled Interface System provides its own object-oriented event handling mechanism on top of DHTML. First, a raw mouse event (e.g., mousedown, mouseup) is caught by the WindowManager and then translated into the event of the Tiled Interface world. Then, the event is informed to the default event handler of the Tiled Interface, then the Tile. Developers may also add additional event handlers to do application specific jobs.

A raw mouse event (e.g., mousedown, mouseup) caught by the WindowManager is translated into the event of the Tiled Interface world. This Tiled Interface event consists of event type, the tile on which the event occurs, and relative position within the tile as percentile (e.g, 35% from top and 77% from left of the tile). So event handling code may be independent of the actual size of tiles. For example, the developer may write an application-level event handler to handle a mousedown event on the left half of a tile and on the right side of a tile differently, no matter what tile size is used.

HTML provides basic event types for user interactions, however, this is insufficient to handle particular kinds of user interactions, such as:

when a user clicks and holds the mouse button (i.e., touching screen in case of touch-panel display) for a while; or, when the mouse cursor moves into or out of the particular logical region (There are already mouseOut or mouseOver HTML events, however, these event works on 'physical' HTML elements. So, for example, if the developer overlays multiple images to represent one widget, these events do not work as the event for the widget.); or when a widget is dragged from one place to another (e.g., a slider).

The Tiled Interface System of the present invention does not use event handling mechanism of the each HTML element. It takes the raw mouse event of the document as a whole, then translates it into its own event types to support particular kinds of user interaction as described above.

Like event handlers, DHTML's timer callback functions are invoked in the global context. Tiled Interface System provides mechanisms to set one 4 time or periodic timer, register the timer event handler, and cancel a timer. This allows developers to handle timer events in the object oriented manner.

Although the present invention was implemented on DHTML technology (i.e., web browsers), it can be likewise implemented on almost any programming language and operating system.

FIG. 13 illustrates a typical hardware configuration of an information handling/computer system in accordance with the invention and which preferably has at least one processor or central processing unit (CPU) 1311.

The CPUs 1311 are interconnected via a system bus 1312 to a random access memory (RAM) 1314, read-only memory (ROM) 1316, input/output (I/O) adapter 1318 (for connecting peripheral devices such as disk units 1321 and tape drives 1340 to the bus 1312), user interface adapter 1322 (for connecting a keyboard 1324, mouse 1326, speaker 1328, microphone 1332, and/or other user interface device to the bus 1312), a communication adapter 1334 for connecting an information handling system to a data processing network, the Internet, an Intranet, a personal area network (PAN), etc., and a display adapter 1336 for connecting the bus 1312 to a display device 1338 and/or printer 1339 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1311 and hardware above, to perform the method of the invention.

This signal-bearing media may include, for example, a RAM contained within the CPU 1311, as represented by the fast-access storage for example. Alternatively, the instructions may be contained in another signal-bearing media, such as a magnetic data storage diskette 1400 (FIG. 14), directly or indirectly accessible by the CPU 1311.

Whether contained in the diskette 1400, the computer/CPU 1311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A tiled interface system, comprising:
   at least one tile cluster as displayed on a display device; and
   a tile manager, as executed by a processor on said system, to manage said at least one tile cluster on said display device and to translate any of an input event into a tile cluster event,
   wherein said tile manager provides an area on said display as entirely covered by a two-dimensional grid of tiles, each said at least one tile cluster comprising a group of adjacent tiles in said tile grid if more than one tile is included in the tile cluster, with tiles being blank tiles at locations in said tile grid where no tile cluster has been implemented, wherein each said tile cluster comprises at least one tile and each said tile cluster corresponds to one or more predefined functions for one or more specific applications, said specific application meaning a specific task or function being an object of an interface with a user rather than meaning a function or functions within an application program that is invoked by an operating system on a computer executing said tiled interface system, said display area having said two-dimensional grid of tiles being dedicated to controlling and/or displaying information related to said one or more specific applications, as said applications have been predefined in said tile manager, such that each said specific application occupies a different area in said tile grid, as one or more tiles assigned to a tile cluster related to said specific application, wherein each said tile cluster provides a user interaction of said one or more predefined functions for said one or more specific applications respectively corresponding to that tile cluster and a display presentation of each said tile cluster has incorporated thereon a visual representation related to said one or more predefined functions of its specific application, and each implemented tile cluster has at least one tile that is always visible in said tile grid that has at least a part of said visual representation related to its predefined functions, and wherein each said at least one tile cluster is selectively presented in its entirety on a single frame of said display device using at most one said input event.

2. The tiled interface system of claim 1, wherein said input event comprises an interaction with one of said tiles on said display device.

3. The tiled interface system of claim 2, wherein each said tile cluster that requires said one input event further comprises at least one "OPEN/CLOSE" tile to cause said tile cluster to:

expand into an entire tile cluster presentation format, if said tile cluster is currently displayed in a compact tile cluster format; and contract from its said entire presentation format into said compact tile cluster format, if said tile cluster is currently in said entire presentation format, and said one input event comprises an interaction with said at least one "OPEN/CLOSE" tile.

4. The tiled interface system of claim 1, wherein said one or more predefined functions for a specific application comprises:

at least one of displaying information related to said specific application; and controlling at least one parameter related to said specific application.

5. The tiled interface system of claim 1, wherein at least one tile has a "CLOSE ALL" function to cause all said tile clusters that are currently expanded to contract into a compact tile cluster format.

6. The tiled interface system of claim 1, further comprising a plurality of said tile clusters, each said tile cluster having a respective said corresponding specific application, wherein said plurality of tile clusters and said corresponding specific applications are related to a common theme.

7. The tiled interface system of claim 6, wherein said common theme comprises environmental functions of an office.

8. The tiled interface system of claim 7, wherein said corresponding specific applications comprises at least one of the following:

a user status;
a lighting status and control;
at least one of outside weather conditions;
at least one of indoor air conditions;
an ambient temperature status and control;
a buddy list;
an ambient noise level indication;
a noise deadening control;
a projector control;
a video display and control;
a personal calendar; and
a "to-do" list.

9. The tiled interface system of claim 1, wherein said system is implemented as a dedicated appliance.

10. The tiled interface system of claim 1, wherein said system is implemented as an applications program on a computer.

11. The tiled interface system of claim 1, further comprising:

a user interface permitting a user to modify said at least one tile cluster.

12. The tiled interface system of claim 11, wherein said user interface comprises a module for adding new tile clusters along with said corresponding functions.

13. The tiled interface system of claim 12, wherein said additional tile clusters can be selected from a data file library.

14. The tiled interface system of claim 11, wherein said user interface comprises a module for formulating a plurality of said tile clusters to generate a new tile user interface (TUI), said TUI comprising a matrix of tiles, as comprising one or more tile clusters, each said tile cluster being related to a specific application and each tile in a tile cluster being related to a specific function for the specific application of that tile cluster.

15. The tiled interface system of claim 11, wherein said user interface further comprises a module for generating a series of instructions to define a function not available in a library of functions.

16. A tiled interface system of claim 1 for an office worker's environment, said tiled interface system containing a plurality of applications comprising at least one of the following:

a user status;
a lighting status and control;
at least one of outside weather conditions;
at least one of indoor air conditions;
an ambient temperature status and control;
a buddy list;
an ambient noise level indication;
a noise deadening control;
a projector control;
a video display and control;
a personal calendar; and
a "to-do" list.

17. A tiled interface system of claim 1, wherein said one input event comprises a "single click" on a user input device.

18. A method of interfacing a user with at least one application, said application comprising at least one function, said method comprising:

providing a two-dimensional grid of tiles covering at least a portion of a display;

for each said application, generating at least one corresponding tile cluster for a display device, each said at least one corresponding tile cluster comprising at least one tile of said two-dimensional tile grid, said application meaning a specific task or function being an object of an interface with a user rather than meaning a function or functions within an application program that is invoked by an operating system on a computer executing said method;

providing an interface allowing said user to provide input events by selecting one of said tiles; and translating any of said user tile selections into a tile cluster event, wherein each said at least one tile cluster can be entirely displayed on said display device using no more than one said tile cluster event and each said tile cluster includes a visual iconic presentation that is related to said at least one function of said application, and wherein, if a tile cluster comprises more than one tile when entirely displayed, upon an occurrence of said tile cluster event, additional tiles added in the entirely-displayed tile cluster appear from previously-blank tiles of the two-dimensional tile grid, to become tiles that complete the visual iconic presentation for that tile cluster.

19. A method of using a display device to interface a user with at least one application, said at least one application comprising at least one function, said method comprising:

dividing a display of said display device into tile units forming a two-dimensional array of tiles;

for each said at least one application, developing at least one corresponding tile cluster, each said tile cluster comprising at least one said tile unit of said two-dimensional array, said tile cluster comprising graphic representation of said at least one function of said corresponding application, each said application meaning a specific task or function being an object of an interface with a user rather than meaning a function or functions within an application program that is invoked by an operating system on a computer executing said method;

providing an input entry for said user to select one of said tile units of said display; and translating any of said user input entries into a tile cluster event, wherein at least one of said at least one tile cluster is selectively presented in its entirety on a single frame of said display device using at most one said input event, said at least one tile cluster entirely presented comprising a plurality of adjacent tiles in said two-dimensional array of tiles, including tiles that appear to be blank tiles in said tile array when said tile cluster is not entirely presented but appear to change appearance upon an occurrence of an input event to said tile cluster.

20. The method of claim 19, further comprising:

a plurality of said applications with said corresponding tile clusters, wherein said plurality of applications is related to a common theme and wherein each of said plurality of said tile clusters has at least one tile unit visible on said display when said tile cluster is in a closed mode presentation.

21. The method of claim 20, wherein said common theme comprises an environment of an office.

22. The method of claim 21, wherein said plurality of applications comprises at least one of the following:

a user status;
a lighting status and control;
at least one of outside weather conditions;
at least one of indoor air conditions;
an ambient temperature status and control;
a buddy list;
an ambient noise level indication;
a noise deadening control;
a projector control;
a video display and control;
a personal calendar; and
a "to-do" list.

23. The method of claim 19, wherein said one tile cluster event comprises a "single click" on a user input device.

24. The method of claim 20, wherein said one tile cluster event comprises a "single click" on a user input device.

25. An apparatus for a tiled interface system, said apparatus comprising:

a display unit;
at least one user input device; and
a device executing instructions for said tiled interface system, wherein said instructions comprise:
 a display module providing instructions for at least one tile cluster to be displayed on said display unit, each said tile cluster comprising one or more tiles of a two-dimensional array of tiles presented on the display unit; and
 a tile manager to manage said at least one tile cluster on said display unit and to translate any of an input event from said user input device into a tile cluster event,
wherein at least one of said at least one tile cluster is selectively presented in its entirety on a single frame of said display unit using at most one said input event and each of said at least one tile cluster is associated with at least one specific application, meaning a specific task or function being an object of an interface with a user rather than meaning a function or functions within an application program that is invoked by an operating system on a computer executing said tiled interface system, and each said tile cluster includes a visual iconic presentation that is graphically related to a function of said application so that any tile cluster comprising a plurality of tiles when entirely presented, upon being entirely presented, replaces tiles representing blank tiles of the tile grid with tiles having additional portions of the visual iconic presentation.

26. The tiled interface system of claim 25, wherein said one input event comprises a "single click" on a user input device.

27. A computer executing a set of instructions for a tiled interface system, said computer comprising:

a display unit;
at least one user input device; and
a CPU executing said instructions for said tiled interface system, wherein said instructions comprise:
 a display module providing instructions for at least one tile cluster to be displayed on said display unit, each said tile cluster comprising at least one tile of a two-dimensional grid of tiles; and
 a tile manager to manage said at least one tile cluster on said display unit and to translate any of an input event from said user input device into a tile cluster event,
wherein at least one of said at least one tile cluster is selectively presented in its entirety on a single frame of said display unit using at most one said input event and each of said at least one tile cluster is associated with at least one specific application, meaning a specific task or function being an object of an interface with a user rather than meaning a function or functions within an application program that is invoked by an operating system on a computer executing said tiled interface system, and each said tile cluster includes a visual iconic presentation that is graphically related to a function of said application such that any tile cluster having more than one tile when the tile cluster is entirely presented, upon being entirely presented by said one input event for said tile cluster, replaces tiles of the tile grid that were previously blank tiles by tiles that complete the visual iconic presentation for that tile cluster.

28. The computer of claim 27, wherein said one input event comprises a "single click" on a user input device.

29. A storage medium tangibly containing a set of computer executable instructions for a tiled interface system, said computer executable instructions comprising:
   a display module for displaying at least one tile cluster on a display device associated with a computer; and
   a tile manager to present a two-dimensional grid of tiles on said display device and to manage said at least one tile cluster on said display device and to translate any of an input event into a tile cluster event, each said tile cluster comprising one or more of the tiles in said two dimensional grid,
   wherein at least one of said at least one tile cluster is selectively presented in its entirety on a single frame of said display device using at most one said input event and each of said at least one tile cluster is associated with at least one specific application, meaning a specific task or function being an object of an interface with a user rather than meaning a function or functions within an application program that is invoked by an operating system on a computer executing said tiled interface system, and each said tile cluster includes a visual iconic presentation that is graphically related to a function of said application such that any tile cluster having more than one tile when the tile cluster is entirely presented is changed, when said input event occurs, to convert tiles in said tile grid that were previously displayed as blank tiles into tiles that complete the visual iconic presentation of that tile cluster.

30. The storage medium of claim 29, wherein said instructions further comprise at least one of the following:
   a user interface permitting said user to modify a functionality of said tile clusters;
   a user interface permitting said user to add new tile clusters along with corresponding functions, including optionally adding new representations on tiles of said new tile clusters;
   a user interface permitting said user to add new tile clusters and corresponding functions from a data file library;
   a user interface permitting said user to generate a new tile user interface by formulating a plurality of tile clusters for said new tile user interface; and
   a user interface permitting said user to generate a series of instructions for at least one function not available in a library.

31. The storage medium of claim 29, wherein said one input event comprises a "single click" on a user input device.

32. A storage medium tangibly containing a set of computer executable instructions for a method of using a display device to interface a user with at least one application, said application comprising at least one function, said method comprising:
   dividing a display of said display device into tile units arranged as a two-dimensional array of tiles;
   for each said at least one application, developing at least one corresponding tile cluster, each said tile cluster comprising at least one said tile unit, each said application meaning a specific task or function being an object of an interface with a user rather than meaning a function or functions within an application program that is invoked by an operating system on a computer executing said method, and each said tile cluster includes a visual iconic presentation that is graphically related to a function or functions of its application;
   providing an input entry for said user based on a capability for said user to select one of said tile units of said display; and
   translating any of said user input entries into a tile cluster event,
   wherein at least one of said at least one tile cluster is selectively presented in its entirety on a single frame of said display device using at most one said input event, such that each tile cluster having more than one tile comprises tiles of said two-dimensional array that are adjacent such that said input event causes said tile cluster to convert tiles previously appearing to be blank tiles in said two-dimensional array to become tiles that complete the visual iconic presentation related to that tile cluster.

33. The storage medium of claim 32, wherein said method further comprising:
   a plurality of said applications with said corresponding tile clusters,
   wherein said plurality of applications is related to a common theme and
   wherein each of said plurality of said tile clusters has at least one tile unit visible on said display when said tile cluster is in a closed mode presentation.

34. A Graphic User Interface (GUI) method of interfacing a user with at least one application, said application comprising at least one function, said method comprising:
   for each said application, generating at least one corresponding tile cluster for a display device, each said at least one corresponding tile cluster comprising at least one tile of a two-dimensional tile grid;
   providing an interface allowing said user to provide input events by selecting one of said tiles; and
   translating any of said user tile selections into a tile cluster event,
   wherein at least one of said at least one tile cluster is selectively presented in its entirety on a single frame of said display device using at most one input event, said tile cluster presented in its entirety being composed of tiles of said two-dimensional tile grid that are adjacent, and
   wherein each said application means a specific task or function being an object of an interface with a user rather than meaning a function or functions within an application program that is invoked by an operating system on a computer executing said method, and each tile cluster having a visual iconic presentation that is graphically related to a function of its application, such that any tile cluster having more than one tile with entirely presented, upon execution of said input event, converts an appearance of tiles of the two-dimensional tile grid appearing to be blank tiles into an appearance that completes the visual iconic presentation associated with that tile cluster.

35. A Graphic User Interface (GUI) method of presenting information to a user for at least one application, said application comprising at least one function, said method comprising:
   dividing a display of said display device into tile units arranged in a two-dimensional tile grid;
   for each said at least one application, developing at least one corresponding tile cluster, each comprising at least one said tile unit;

providing an input entry for said user based on a capability for said user to select one of said tile units of said display; and translating any of said user input entries into a tile cluster event, wherein at least one of said at least one tile cluster is selectively presented in its entirety on a single frame of said display device using at most one input event, wherein each said application means a specific task or function being an object of an interface with a user rather than meaning a function or functions within an application program that is invoked by an operating system on a computer executing said method, and wherein each said tile cluster includes a graphic iconic representation related to the specific task or function of its application and each tile cluster has at least one tile always visible with at least a portion of said graphic iconic representation, such that any tile cluster having more than one tile when entirely presented upon occurrence of said input event, converts tiles of said two-dimensional tile grid previously appearing to be blank tiles into tiles that complete said graphic iconic representation associated with that tile cluster.

36. A method of presenting information for an application, said application comprising at least one function, said method comprising:

generating at least one corresponding tile cluster for a display device, each said corresponding tile cluster comprising at least one tile of a two-dimensional tile grid;

providing an interface allowing a user to provide input events by selecting one of said tiles; and translating any of said user tile selections into a tile cluster event, wherein at least one of said at least one tile cluster is selectively presented in its entirety on a single frame of said display device using at most one input event and each of said at least one tile cluster is associated with at least one application, said application meaning a specific task or function being an object of an interface with a user rather than meaning a function or functions within an application program that is invoked by an operating system on a computer executing said method, and each said tile cluster including a graphical iconic presentation related to the task or function of its application and each tile cluster has at least one tile always visible that displays at least a portion of said graphic iconic presentation such that any tile cluster having more than one tile when entirely presented, upon an occurrence of said input event for said tile cluster, converts an appearance of tiles of said tile grid from blank tiles into tiles that complete the graphic iconic presentation for that tile cluster.

37. The method of claim 36, wherein said one tile cluster event comprises a "single click" of a user input device.

\* \* \* \* \*